INVENTOR.
BERNARD W. GAMSON
BY Fulwider, Patton, Rieber
Lee, and Utecht
ATTORNEYS

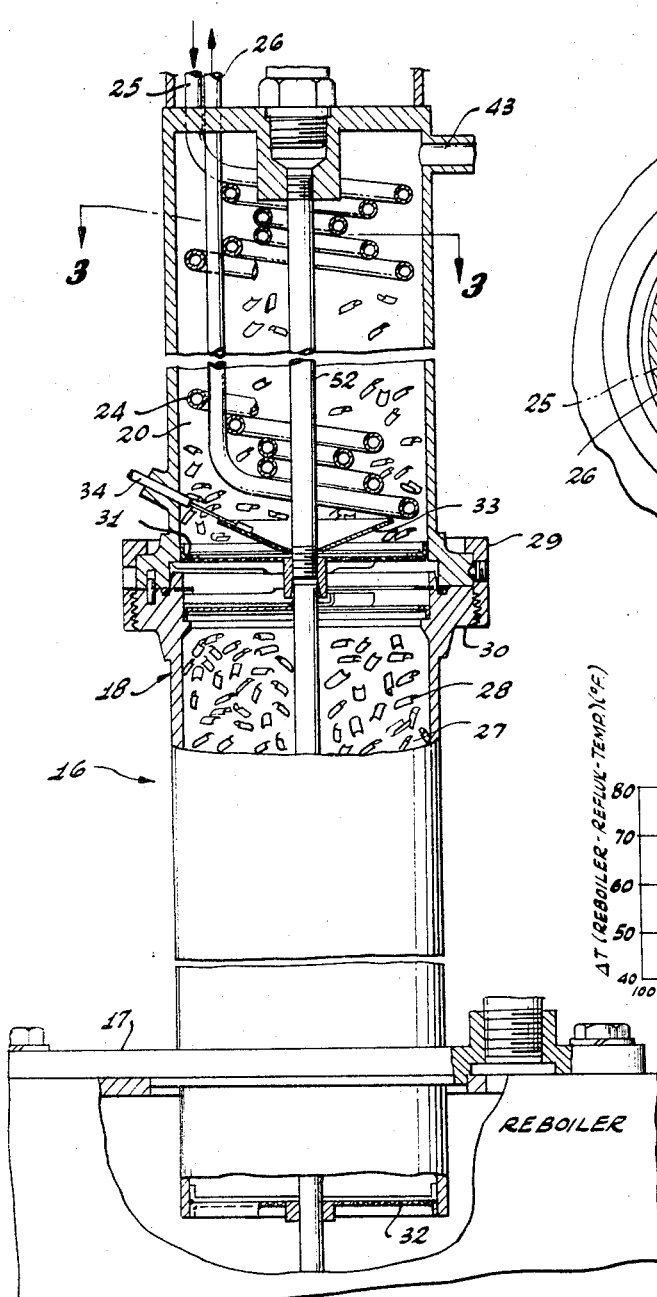

United States Patent Office 3,440,865
Patented Apr. 29, 1969

3,440,865
CONTINUOUS PERCENT EVAPORATED ANALYZER
Bernard W. Gamson, Los Angeles, Calif., assignor to Technical Oil Tool Corporation, Glendale, Calif., a corporation of California
Filed Apr. 6, 1967, Ser. No. 628,991
Int. Cl. G01n *11/00*
U.S. Cl. 73—61.3                              29 Claims

ABSTRACT OF THE DISCLOSURE

An analyzer for continuously determining percent evaporated values for multi-component fluids including a vaporization unit comprising (a) a reboiler into which a sample is flowed at constant flow rate to be fractionated at a preset temperature into a liquid phase which flows out of the reboiler in accordance with a preset liquid level controller and a vapor phase which passes into (b) a tower carrying a partial reflux condenser therein which condenses, at a preset reflux temperature, some of the vapor for return to the reboiler, the remaining vapor passing out of the tower in accordance with a preset tower pressure.

Background of the invention

This invention relates to method and means for continuously determining the proportion of a multi-component liquid vaporizing at a given temperature and more particularly, to the percent of a petroleum fraction vaporizing at a given temperature.

In continuous process industries in which the product is a multi-component product, such as the oil industry, it is necessary to continuously identify the product being produced. Identification is usually accomplished by determining changes in a particular physical characteristic, for example, boiling point or percent evaporated, of the product. It is of the utmost importance that the test procedures employed be reproducible, that is, that substantially the same results be obtainable from the same test sample when tested at different times. Additionally, it is highly desirable for the adopted test procedure to provide accurate results, that is, results which are identical with or closely approximate theoretical values.

Identification of a product has generally been accomplished by obtaining samples throughout the operating period and thereafter running the appropriate tests in a laboratory. Although this batch test procedure provides relatively accurate results, a substantial time lag exists between the taking and testing of the samples. During this period significant changes in the process can take place without any corrective action being taken because of the lack of information on which to base a change in operating parameters.

More recently, procedures and apparatus have been developed which continuously monitor a particular physical characteristic of a product from which the product can be identified. An advanced procedure of this type, in which the percent evaporated of test samples is continuously monitored, is described in the co-pending application of Wilbur G. Heath, entitled "Percent Evaporated Analyzer," Ser. No. 588,835, filed Oct. 24, 1966 (assigned to the instant assignee). The test procedure described therein is relatively accurate, reproducible and repeatable provided external atmospheric conditions are not subject to substantial changes. Because the accuracy of such procedure is influenced by the amount of heat loss through the walls of the distillation tower marked changes in external conditions cause the accuracy and/or repeatability of the therein-described test procedure to decrease from an optimum.

Summary of the invention

The test method described herein for continuously determining the percent evaporated of a multi-component liquid comprises vaporizing a fraction of the test sample entering the herein-described vaporization apparatus while maintaining the following parameters constant: liquid feed rate to the vaporization unit; vaporization unit vapor pressure; liquid level in the vaporization unit; heat loss from the vaporization unit; and the liquid temperature in the vaporization unit. The effect of controlling the aforementioned parameters is to leave only one parameter variable—the percent evaporated at the set temperature.

The heat loss from the vaporization unit is controlled by insulating the unit so that substantially no heat is lost through the walls of the unit and further, by flowing coolant through a reflux condenser located in the vapor section of the vaporization unit. The amount of coolant flowing through the internal reflux condenser is controlled by setting the temperature of the condenser condensate, that is, the reflux temperature, at a particular temperature, such that a desired temperature difference between the temperature of the liquid in the bottom of the vaporization unit and the reflux temperature is maintained. The aforesaid temperature difference varies with the temperature of the liquid in the bottom of the unit, but the reflux and bottoms liquid temperatures are controlled independently of each other. Packing is placed in the reflux section of the vaporization unit and the reflux condenser has a preferred configuration to provide relatively uniform cooling of all the vapor passing upwardly through the unit, so that highly accurate percent evaporated data are produced.

By closely controlling the heat loss from the herein-described vaporization unit, in conjunction with maintaining the other aforementioned parameters constant, the amount of refluxing in the vaporization unit, which is directly related to the percent evaporated, is made to vary only with the composition of the sample. That is, the reflux ratio does not vary with, for example, external conditions, which, in practice, are not controllable. For this reason, the data provided by this invention is highly reproducible and very accurate. This is true even though the apparatus of this invention may be exposed to substantially different climatic conditions. Thus it will be understood that the same test apparatus may be manufactured for use anywhere in the world and, whenever used, will provide highly reproducible and accurate results.

The foregoing reproducibility has been provided without any increase in the time required to reach new equilibrium conditions when the composition of the test sample changes. Thus, the method of this invention provides data as quickly as prior art continuous test procedures while providing greater reproducibility and accuracy.

The previously-described, controlled parameters are independently controlled so that a change in operating conditions affecting one of these controlled parameters does not necessarily affect any of the other controlled parameters. Such operation gives an operator excellent control over the apparatus of this invention. Additionally, such operation provides good repeatability which is defined as the ability of the apparatus to produce the same percent evaporated values after a temporary upset in operating conditions as were produced before the upset.

Description of the drawing

FIGURE 2 is a fragmentary section of the distillation tower showing integrated partial reflux condenser contained therein.

FIGURE 3 is a cross-section along line 3—3 of FIGURE 2.

FIGURE 4 is a universal correlation curve for gasoline based on Table II, Col. 12 hereof.

Description of the preferred embodiment

Figure 1:
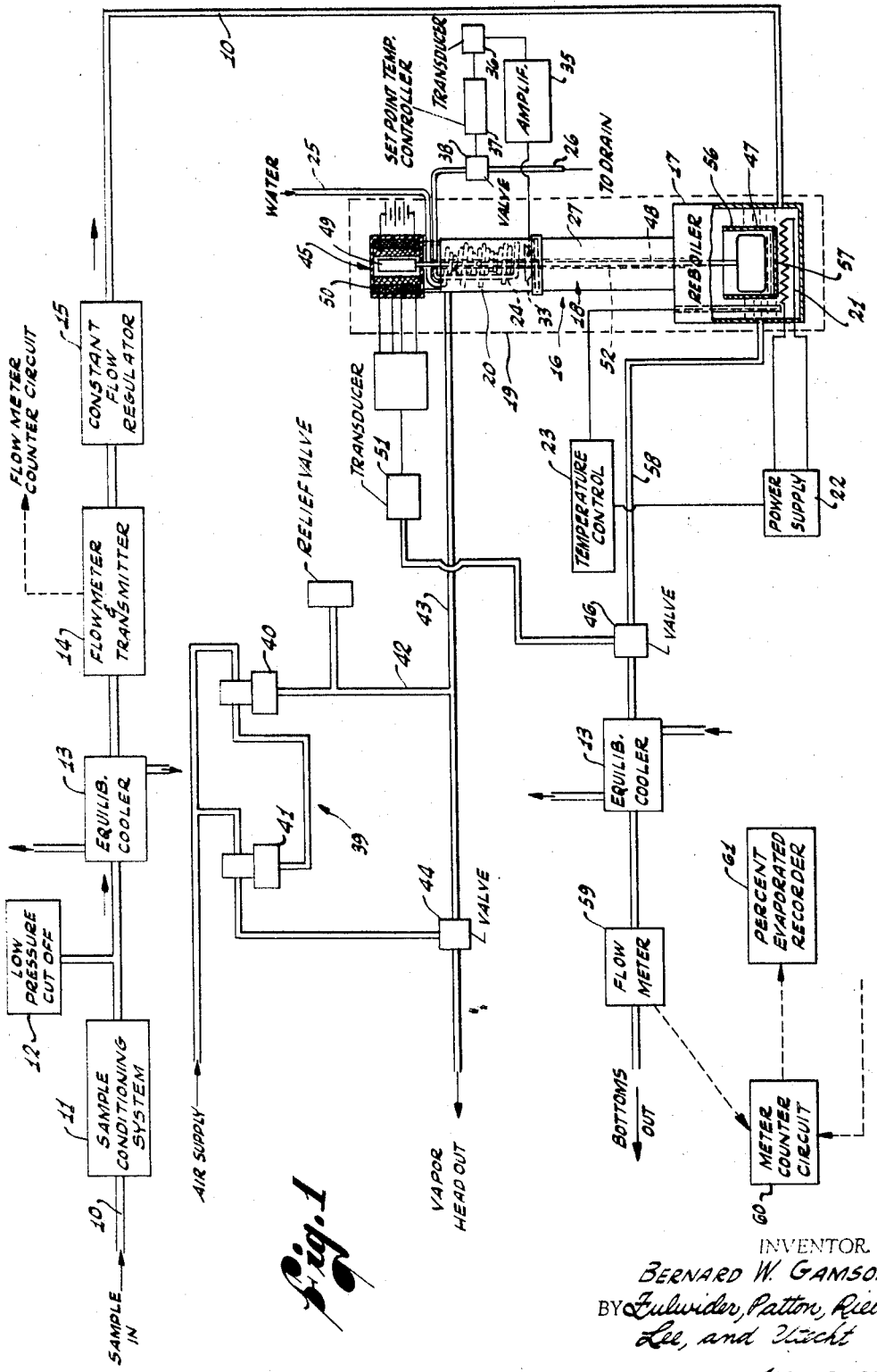
FIGURE 1 is a schematic floor sheet of overall process system showing improvements provided by this invention.

In general, percent evaporated values of multi-component products are continuously determined by the method of this invention by continuously sampling the product and passing the sample through the herein-described apparatus which includes a vaporization unit in connection with which the following operating parameters are maintained constant: sample fed rate; vapor pressure; liquid level; heat loss; and liquid temperature. The remaining variable—percent evaporated—is a function only of the composition of the sample. That is, as the composition of the sample changes, the percent evaporated will change.

The improved accuracy and reproducibility of this invention is due to close control of the heat loss from the vaporization unit in contrast to prior art vaporization units. In the standard vaporization or distillation unit, a liquid is heated in the bottom section of the unit to a temperature above the vaporization temperature of at least a fraction of the liquid. The vaporized fraction passes upwardly through the upper section or tower of the vaporization unit. Due to heat loss through the walls of the tower (even when insulated), some of the vapor fraction is condensed and returns to the bottom section of the unit. The remainder of the vapor fraction passes out of the tower and represents the percent evaporated at the particular operating temperature and pressure for the particular product composition distilled. Thus it will be understood that for a particular product composition entering the vaporization unit, the reflux ratio or ratio of vapor passing out of the unit as vapor to the liquid condensed from the vapor and returned to the unit will vary with the amount of heat lost through the walls of the tower. Heat lost through the tower will, in turn, vary as the external temperature varies. Therefore, the reflux ratio which determines the percent evaporated will vary with external conditions. Thus, varying percent evaporated values are obtained for a particular composition under particular internal operating conditions in the conventional distillation unit. To be effective, prior art instruments have to be correlated with local atmospheric conditions and movement of an instrument to another location in the same general area usually requires further calibration.

In the herein-described apparatus, the heat loss from the vaporization unit is closely controlled so that the heat removed from the unit produces a desired predetermined temperature profile in the vaporization unit. This controlled heat loss produces a constant reflux ratio and, therefore, constant percent evaporated values for a particular composition of the multi component fluid. When the composition changes (without any changes in the other operating conditions), the reflux ratio and, therefore, the percent evaporated, change accordingly. Because the percent evaporated values are continously monitored by the analyzer and method of this invention, changes in the composition of the sample are readily detected and appropriate adjustments in the make-up tanks can be made to alter the composition of the product to provide the desired composition. Attainment of the desired composition will be indicated by a return of the percent evaporated values to their initial values.

Control of the heat loss from the vaporization unit of this invention is positive, that is, heat is removed in predetermined amounts without relying upon the vagaries of external conditions. Heat is removed from the vapor produced in the vaporization unit by (a) insulating the unit so that substantially no heat is lost through the walls of the unit and (b) removing heat by passing a coolant (at known temperature and flow conditions) through a reflux condenser located within the vaporization unit. By removing heat in this manner, the reflux ratio and, therefore, the percent evaporated, for a particular composition at particular operating conditons is made substantially constan, reproducible and repeatable.

The method and means of this invention will first be generally described with reference to FIGURE 1. Sample liquid is continuously drawn from the gasoline products line and is fed under pressure into the percent evaporated analyzer. The sample flow rate is controlled at a preset flow rate and measured and recorded before the sample passes into a vaporization unit 16. In the vaporization unit 16 the sample is heated at a fixed, predetermined temperature to cause at least some of the sample liquid to vaporize, thereby producing a liquid phase and a vapor phase. The vapor so formed collects in the upper part of the vaporization unit 16. Part of this vapor is condensed at a predetermined and controlled reflux temperature and returned to the bottom of the vaporization unit 16 when the vapor contacts a reflux condenser 24 located within the vaporization unit. The remaining vapor passes out of the vaporization unit 16 as vapor overhead when the unit pressure, which is held constant, is exceeded. The vapor overhead continues to pass out of the vaporization unit 16 through a vapor overhead line 43 until the pressure is reduced to the constant pressure value. The liquid remaining in the vaporization unit 16 accumulates until it exceeds a predetermined volume which is regulated by a constant level controller 45. When this level is exceeded the excess liquid exits from the bottom of the vaporization unit 16 through a liquid bottoms line 58.

Either the vapor or the liquid leaving the vaporization unit 16 may be metered. Regardless of which sample phase metered the metered value is related to the sample feed rate to produce the percent evaporated values. The percent evaporated value and the corresponding reflux temperature are used to identify the gasoline composition by relating the analyzer-derived data to ASTM D–86 data or data provided by other test methods as will hereafter be described in connection with the operation of this invention.

The method and means of this invention will now be described in greater detail with reference to FIGURE 1. Sample under pressure is continuously fed through an input line or duct 10 into a sample conditioning system 11 wherein the sample is filtered and any entrained water is removed. The pressure maintained on the sample in the sample input line 10 is sufficient to ensure entry of the liquid sample into the vaporization unit 16. Should the sample input pressure drop below a particular level, for example, 20 p.s.i.g., a low pressure, cut off system 12 shuts off the main power source, thereby stopping heating of the liquid sample in the vaporization unit 16.

The sample next passes through one or more coolers designed to reduce the temperature of the sample to known predetermined value. The last cooler through which the sample passes, where a number of coolers are used, or where only a single cooler is used, is an equilibrium cooler 13. Coolant, preferably water, flows through the shell side of the equilibrium cooler 13 which carries within it a pair of independent coils (not shown). The liquid sample feed flows through one of these coils and the bottoms liquid from the vaporization unit 16 flows through the other coil. The flow of coolant is adjusted so that the temperature of the sample feed and of the liquid bottoms exiting from the equilibrium cooler 13 is substantially the same. Maintaining the liquid feed and liquid bottoms temperatures equal eliminates errors in flow rate measurement produced by volume changes resulting from unequal temperatures.

After exiting from the equilibrium cooler 13 the sample liquid is metered by a flow meter and transmitter 14. The measured flow rates are transmitted to a meter counter circuit 60 which will be further described hereafter in connection with measurement of the overhead vapor or liquid bottoms from the vaporization unit 16. The liquid sample next passes through a constant flow regulator 15 which can be adjusted to provide the desired flow rate. A number of regulators exist which can provide good flow control. For example, a flow regulator which responds to the pressure drop through an orifice plate placed in the input sample line 10 provides satisfactory flow control due to its simplicity and dependability. Since line pressure drop will vary with changes in density of the sample fluid the flow rates will change as the fluid density changes. However the resulting small changes in flow rate do not affect the operation of the analyzer. For all practical purposes the sample liquid flow rate is a constant and independent of the sample composition.

The sample liquid next passes along the input line 10 into the vaporization unit 16. This unit comprises a reboiler 17 and a tower 18. The vaporization unit 16 is well insulated so that substantially no heat is lost from the unit through the walls of the unit. Insulating the vaporization unit 16 may be accomplished in a number of ways such as, for example, by wrapping a unit with a heat insulator sufficiently thick to substantially eliminate heat loss through the walls of the unit. At present, it is preferable to place the entire vaporization unit 16 in a box 19, shown in dotted outline in FIGURE 1, filled with small particles of a heat insulator such as expanded vermiculite.

The reboiler 17 contains a heater 21 which is electrically connected through a power source 22 to a temperature controller 23. The temperature controller 23 monitors the temperature at a predetermined reference location within the liquid in the reboiler 17. As the temperature at the monitored location changes, the temperature controller 23 responds by turning the heater 21 on if the monitored temperature is lower than a preset temperature or turning the heater off if the reference temperature is higher than the preset temperature. Thus, regardless of the temperature of the sample fluid as it enters the reboiler 17 the temperature controller 23 will raise the temperature of the sample at the monitored location in the vaporization unit 16 to the set temperature thereby maintaining a constant temperature at a predetermined point in the vaporization unit.

The tower 18 (FIGURE 2) carries a cooling coil or internal reflux condenser 24 in the upper or cooling section 20 thereof. Since the purpose of the cooling coil 24 is to cool a portion of the vapor moving upwardly through the tower 18 from the reboiler 17, it is preferable to employ a cooling coil configuration which presents cooling surfaces to all of the vapor passing upwardly through the tower and yet which does not unduly restrict the upward flow of vapor. Preferably a coil such as that shown in FIGURE 2 is employed to accomplish the foregoing purposes. The preferred cooling coil 24 comprises a continuous tubing formed to provide a plurality of concentric rings of varying diameter. The thus formed rings are positioned relative to each other to provide a cooling coil having alternately increasing and decreasing diameter. The top of the cooling coil 24 is connected to a coolant source (not shown) through a line 25. Coolant, which is preferably water, after passing through the cooling coil 24 passes out of the tower 18 from the bottom of the cooling coil through an exit line 26.

The internal reflux condenser or cooling coil 24 may be constructed of various thermally conductive metals and may have any overall length provided cooling of the vapor in the tower 18 is sufficient to maintain the preset tower or reflux temperatures constant. A cooling coil 24 which has been found to be satisfactory in a vaporization unit having about a 2.1 g.p.h. sample feed is a 0.250 inch stainless steel tube of 0.035 inch wall thickness having an uncoiled length of 15 feet. Because the water moves slowly downward through the coil 24 to provide better cooling, a large positive pressure of about 100 p.s.i.g. is placed on the water to prevent boiling.

It is preferable to pack the lower section 27 of the tower 18 up to the cooling section 20. Packing the tower 18 has a number of advantages depending upon the height of the tower, including the following: improved repeatability of data points; improved temperature control and response; and improved vapor-liquid separation. It has now been found that it is preferable to also pack the tower 18 throughout the cooling section 20 in addition to packing the lower section 27 of the tower. The packing 28 within the lower section 27 of the tower 18 may be metal or ceramic such as, for example, Berl saddles made of alumina. However, to provide heat transfer between the cooling coil 24 and the vapor passing upward through the tower 18, the packing 28 in the cooling section 20 of the tower should have a relatively high thermal conductivity. An adequate packing for this purpose is Pro-Pak® No. 024 (manufactured by Scientific Development Company, Pennsylvania) which is a stainless steel packing. The effect of such packing is to distribute the condensed liquid throughout the tower to provide greater vapor-liquid, heat transfer interaction.

To facilitate assembly and disassembly of the tower 18 it is preferable to manufacture the tower in two separate sections—the upper cooling section 20 and the lower section 27. The upper portion of the lower section 27 of the tower 18 and the lower portion of the cooling section 20 of the tower are provided with mating circumferential flanges 29, 30, respectively, which are interconnected when the tower is assembled by any convenient releasable locking means. In disassembled condition the two sections 20, 27 of the tower 18 are separately filled with packing, the cooling section being packed when in an upside down position. After the cooling section 20 is packed, a retaining screen 31 is fixed in position within the tower adjacent the flange 29 to hold the packing in the cooling section when the tower 18 is assembled. This retaining screen 31 also serves the purpose of strengthening the middle section of the tower 18 thereby reducing the size of the flanges 29, 30 which, in turn, reduces the amount of heat lost through the walls of the tower. A second retaining screen 32 is positioned within the tower adjacent the lower end of the lower section 27 to support the packing in the lower section.

As heating of the sample continues some of the liquid vaporizes and passes up the tower 18 while the remaining liquid accumulates in the reboiler 17. The vapor passing upwardly in the tower 18 is further fractionated by contact with the cooling coil 24 and the packing 28. The liquid which is condensed from the vapor by the cooling coil 24 flows countercurrently to the vapor downwardly through the upper screen 31 into the lower section 27 of the tower 18 and thence into the reboiler 17. To maintain a constant reflux temperature, the coolant flow through the cooling coil 24 is adjusted in relation to the temperature of the liquid condensed from the vapor in the cooling section 20. This is accomplished by entrapping a portion of the condensed liquid in a conical receptacle 33 positioned below the cooling coil 24 and positioned centrally above the upper screen 31.

Liquid in the receptacle 33 primarily escapes by flowing outwardly over the edges of the receptacle. The temperature of the condensed liquid in the receptacle 33 is continuously monitored by a thermocouple 34 extending into the liquid in the receptacle and passing outwardly through the walls of the tower 18 to an amplifier 35 which amplifies the EMF produced in the thermocouple. The amplified EMF is relayed to a transducer 36 which is connected to a set point temperature controller 37 which in turn operates a valve 38 in the coolant exit line 26 in accordance with the difference in the set point temperature and the reflux temperature measured at the receptacle 33. Thus, if the reflux temperature is lower than the set point temperature, the controller 37 will act on the valve 38 to reduce the rate of flow of coolant through the cooling coil 24 thereby increasing the reflux temperature. Conversely, if the reflux temperature is too high, the set point temperature controller 37 opens the valve 38 to increase the flow of coolant through the cooling coil 24, thereby reducing the reflux temperature.

The vapor which is not condensed by the cooling coil 24, vapor overhead, accumulates in the top of the tower 18 until permitted to exit by the vapor pressure controller 39. This occurs when the tower vapor pressure exceeds the preset pressure of the vapor pressure controller 39. The vapor pressure controller 39 is set to open at a pressure which is less than the vapor pressure of gasoline at a temperature near the lower end of the tower operating temperatures. The equilibrium vapor pressure of gasoline at 170° F. is above 10 p.s.i.g. At this pressure, percent vaporization greater than 10 percent is obtained. Thus a vapor pressure controller 39 setting of about 10 p.s.i.g. maintains a satisfactory operating pressure.

Provided the tower pressure is closely controlled at a predetermined value as described, it is unimportant for purposes of the accuracy in an absolute sense and the reproducibility of the method of this invention at what pressure the vaporization unit is operated. However, where it is desired to correlate the percent evaporated values determined by this invention to another method such as the ASTM D-86 test method or the True Boiling Point (TBP) method, it is preferable to operate the hereindescribed analyzer at a pressure as close to the pressure at which the other method is run as possible. For example, where the percent evaporated values determined by the herein-described method are to be correlated with the percent evaporated values determined by ASTM D-86, it is preferable to operate the vaporization unit at a pressure as close to ambient pressure as possible, since the ASTM D-86 data are obtained at ambient pressure. Operation of the apparatus of this invention near ambient pressure substantially reduces the necessity for arbitrarily "forcing" of the apparatus and method of this invention to correlate with data produced by the ASTM method. For the purpose of correlating the percent evaporated data of this invention with the data derived from the ASTM D-86 procedure, the tower pressure should be just above that value necessary to maintain both liquid and vapor flow in the tower.

The preferred embodiment of the vapor pressure controller 39 is shown in FIGURE 1. This comprises a first and a second amplifier 40, 41 respectively. Pressure is placed on the first amplifier 40 by the overhead vapor acting through a line 42 which is interconnected with the overhead vapor line 43. When the pressure on the first amplifier 40 is 10 p.s.i.g. (assuming this to be the tower control pressure), no pressure is placed on the second amplifier 41. A small pressure increase, for example, from 10 p.s.i.g. to 10.2 p.s.i.g. due to an increase in tower vapor pressure, when applied to the first amplifier 40 causes a larger pressure to be applied to the second amplifier 41, for example, up to 5 p.s.i.g. This pressure is further magnified, for example, by the second amplifier to 15 p.s.i.g. This amplified pressure then acts to open an overhead valve 44 and allow the vapor to exit from the analyzer until the tower vapor pressure falls to the set pressure of 10 p.s.i.g. Thus a small incremental change in tower vapor pressure is sensed by the vapor pressure controller 39 and amplified to a pressure capable of opening the overhead valve 44 to discharge the excess vapor.

The portion of the sample liquid which vaporizes at a temperature higher than the reboiler temperature accumulates in the reboiler 17. As the accumulating liquid increases in volume, the liquid level in the reboiler 17 rises until it exceeds a level which is maintained constant by the liquid level controller 45. When the preset reboiler liquid level is exceeded, the liquid level controller 45 opens a bottoms exit valve 46 allowing the liquid to flow out of the reboiler 17 until the reboiler liquid level falls to the preset level.

Various liquid level controllers may be used. For example, it has been found satisfactory to employ a standard float and float rod having a magnet attached thereto so that when the float is moved upwards by the rising liquid level the magnet closes a switch. The switch then opens a solenoid valve to permit liquid flow from the reboiler. Also, the liquid level controller 45 may comprise a capacitance probe connected to an electrical system which is in turn connected to a pneumatic converter or transducer capable of opening and closing a diaphragm valve.

It is preferable to employ a level controller 45 which provides a continuous flow of bottoms liquid from the reboiler 17. Continuous flow simplifies measurement of the bottoms flow rate and provides for smoother operating conditions, that is, flow conditions which tend to be steady rather than fluctuating. Such flow produces more accurate results. As an example of a continuous flow controller, I have successfully used a float which, in combination with a transformer, transfers an electrical signal which is converted to a pressure signal to the bottoms exit valve 46 in response to liquid level changes in the reboiler 17. More specifically, this liquid level controller (FIGURE 1) comprises a float 47, a float rod 48 extending upwardly therefrom through the top of the tower 18 and having a metal slug 49 fixedly attached to its upper end, and a transformer 50 having two separate secondary windings. The metal slug 49 moves axially within the transformer 50 and between the two secondary windings such that an "open" signal is always transmitted through, for example, a transducer 51 to the bottoms valve 46. However, the degree of "openness" will vary depending upon the level of the liquid in the reboiler. The net result of using the aforedescribed level controller is that a continuous flow of bottoms liquid is continuously metered to provide more accurate results in a shorter response time.

To prevent the float rod 48 from being restricted in its vertical movement by, for example, the packing 28, and to restrict horizontal movement of the float rod, the rod is movably positioned wtihin a tubular housing 52 which extends the length of the tower and is fixedly located centrally thereof. The float rod housing 52 extends through aligned openings 53, 54 and 55 in the receptacle 33, upper screen 31, and lower screen 32, respectively.

Because some foam is produced at the surface of the liquid in the reboiler 17, it is preferable to employ a float shield 56 in the reboiler to provide more accurate liquid level readings. Such a float shield 56 comprises a cylindrical housing having an open roof portion and a bottom portion having an aperture 57 therein. The liquid refluxing from the tower 18 and falling back into the reboiler 17 produces a downward flow of liquid within the float shield 56. Thus, liquid in the float shield 56 will flow downwardly through the aperture 57, thereby preventing bubbles from passing upwardly into the liquid level sensing area. Additionally, the flow of liquid downwardly through the aperture 57 provides improved mixing with the sample feed flowing upwardly about the exterior of the float shield 56.

From the foregoing it will be apparent that the reboiler liquid level, the reboiler liquid temperature, the tower vapor pressure and the tower reflux temperature is each controlled independently of the other parameters. Thus, changes, for example, in sample feed characteristics, although temporarily upsetting one of the aforementioned control parameters will have little or no effect on the remaining controller parameters. The independence of these control points provides improved stability, thereby providing more accurate and repeatable percent evaporated values than is obtainable with prior art instruments.

To provide the percent evaporated values, the volume of either the vapor overhead or liquid bottoms may be measured. It is necessary to condense the vapor overhead prior to measuring the overhead vapor flow rate to provide accurate ratings. However, it is not always possible to condense all the overhead vapors. Thus, some bubbles may be present in the condensed vapor and the presence of such bubbles introduces errors into measurement of the overhead flow rate. Therefore, it is preferable to measure the bottoms liquid flow rate rather than the overhead flow rate. Furthermore, because the overhead is vapor and requires substantial cooling, it is preferable to measure the liquid bottoms which requires substantially less cooling. In any event, the following steps for metering liquid bottoms are generally applicable to metering the vapor overhead.

After passing out of the reboiler 17, the bottoms liquid passes through the bottoms exit line 58 and through the valve 46 which is operated by the reboiler level controller 45 as previously described. The bottoms liquid then passes through one or more coolers to reduce the temperature of the bottoms liquid to the same temperature as the liquid feed. This may be done by passing the bottoms liquid through a series of coolers, the last cooler of which is the equilibrium cooler 13 previously described in connection with temperature reduction of the sample feed liquid or, the bottoms liquid may be flowed only through the equilibrium cooler to bring the bottoms liquid to a temperature substantially equal to the sample feed temperature. Thereafter, the bottoms liquid flows through a flow meter and transmitter 59 which measures and transmits the flow rate of the bottom liquid to the metered counter circuit 60.

In the meter counter circuit 60 the bottoms flow rate is electronically related to the input sample flow rate which is transmitted to the meter counter circuit from the flow meter and transmitter 14 in the input feed line 10. The calculation made by the meter counter circuit 60 varies somewhat depending on whether the overhead vapor or the bottoms liquid is being measured. If the overhead vapor is being measured, the overhead vapor flow rate can be compared directly to the input sample flow rate to provide percent evaporated values. However, if the bottoms liquid flow rate is being measured, the measured value is compared with the input sample flow rate and the resulting value (as a percent) is subtracted from 100 to produce percent evaporated values. In either event the resulting percent evaporated value is recorded on a percent evaporated recorder 61.

After flowing through the flow meter and transmitter 59, the bottoms liquid flows out of the analyzer.

Operation of the percent evaporated analyzer of this invention will now be described. Sample liquid is fed into the analyzer and power to the analyzer is turned on. The sample liquid flows into the analzyer at a pressure somewhat higher than the constant vapor pressure in the tower 18. For example, if the tower pressure is held constant at 10 p.s.i.g., a pressure of about 20 p.s.i.g. on the input sample line 10 provides satisfactory results.

The constant flow regulator 15 is adjusted to provide the desired sample liquid flow rate into the reboiler 17. This is done by setting the constant flow regulator 15 so that sample flow liquid entering the reboiler 17 has sufficient time to come to equilibrium with the liquid in the reboiler. Preferably, the liquid sample flow rate into the reboiler is relatively small as compared to the liquid volume in the reboiler. However, the sample flow rate to the reboiler 17 should not be too low because very low sample flow rates will produce low bottoms flow rates thereby increasing the percent error in bottoms flow meter readings. For example, good results have been produced using a sample flow rate of about 150 cc. per minute with a reboiler having about a 900 cc. capacity, that is, a flow rate in absolute terms of about 17% of the reboiler liquid volume.

Having adjusted the flow regulator 15 to provide the desired flow rate to the reboiler 17, the sample liquid is then fed into the reboiler at a point below the surface of the liquid in the reboiler. Introduction of the sample fluid into the vaporization unit 16 at a point adjacent the bottom of the reboiler 17 provides for improved temperature control in addition to preventing flooding of the tower 18. It is also preferable to introduce the sample feed into the reboiler 17 at a point some distance removed from the bottoms outlet line 58 to prevent sample feed from passing directly from the input line 10 to the bottoms outlet line. These advantages are due to the admixing of the sample feed to the reboiler 17 with the liquid already present in the reboiler. Such admixing tends to produce a temperature homogeneous mixture thereby greatly reducing the effects due to changes in sample feed characteristics, for example, composition.

The liquid level controller 45 and the vapor pressure controller 39 are adjusted to provide the desired operating conditions. Sample liquid is then fractionated into low-boiling vapor and high-boiling liquid. Each fraction passes out of the vaporization unit 16 when the present vapor pressure and liquid levels are exceeded.

If the liquid level in the reboiler 17 is not maintained constant, liquid will either remain in the reboiler longer than it should, that is, accumulate, or leave the reboiler sooner than it should. The effect of a fluctuating liquid level can best be understood by following a unit volume of sample liquid as is enters the reboiler in a unit time. At a particular vaporization unit 16 operating temperature and pressure, a fraction $(v)$ of the unit volume will vaporize and the remaining amount $(l-v)$ will remain liquid. In order to produce an accurate percent evaporated reading when measuring the liquid bottoms flow rate, the liquid fraction $(l-v)$ must theoretically leave the reboiler in the unit time. If accumulation occurs in the reboiler, liquid in an amount less than $(l-v)$ will leave the reboiler in the unit time. Conversely, if the reboiler liquid level decreases, more than the amount $(l-v)$ will leave the reboiler in unit time. In either case, an error will occur in the dettermination of the percent evaporated values.

In addition to the aforedescribed measurement errors arising from fluactuating liquid levels, other disadvantages can occur when the liquid level does not remain constant. For example, siphoning of the liquid through the outlet line 58 may occur when such line is located at the liquid surface level if liquid is permitted to accumulate. Additionally, accumulation may result in liquid being carried further up the tower 18 than desired. thereby upsetting tower temperatures and may in addition flood the tower.

Failure to maintain a constant tower pressure can also produce erroneous percent evaporated readings. Examining the same unit volume of sample liquid to the reboiler 17, it will be understood that the fraction $(v)$ of the sample liquid will vaporize at a particular temperature and pressure. If the tower pressure changes, for example, rises, a smaller fraction of the sample liquid will vaporize at a given temperature. Thus, more of the unit volume than the fraction $(l-v)$ will pass out as liquid bottoms. The effect will be to produce percent evaporated results which vary with changes in tower pressure. Such results would be of little use because of their lack of correlation with each other or with ASTM D–86 values.

The desired reflux temperature is set on the tower set point temperature controller 37. This reflux temperature is the temperature at which the percent evaporated is to be determined and varies with the requirements of the user of this analyzer. The reflux temperature is set at a temperature within the boiling point range at the analyzer operating pressure of the product being analyzed. For example, for gasolines, the reflux temperature will be a temperature within the temperature range between about 100° F. and about 450° F.

Having selected the reflux temperature, the temperature of the reboiler liquid is set on the reboiler temperature controller 23 to provide a temperature differential ($\Delta T$) between the reflux temperature and the reboiler temperature such that operation of the analyzer at such reflux temperature and $\Delta T$ provides percent evaporated values which are very accurate and reproducible. The $\Delta T$ at a particular reflux temperature is predetermined by determining the percent evaporated values at the desired reflux temperature by the herein-described method while varying the reboiler temperature. The percent evaporated values so obtained are correslated with percent evaporated values determined at the same temperature as the reflux temperature by another method, for example, ASTM D-86 test method. The ΔT which provides the same percent evaporated values as that determined by the other test method is the selected ΔT at which the analyzer of this invention is operated when the reflux temperature is the same as that set in the correlation test.

Correlation of the analyzer of this invention with ASTM D-86 test method for various gasolines is shown in the following test. An analyzer, as described herein, was placed in a metal and wood box (3' high x 1.5' square) and the box was filled with No. 2 grade expanded vermiculite. The test fluids were two grades of each of two brands of gasoline. The feed rate to the vaporization unit was set at about 2.1 g.p.m. The liquid level controller was set at a predetermined level and the vapor pressure controller was set to open at 10 p.s.i.g. The coolant flowing through the internal reflux condenser 24 was water. A number of reflux temperatures were selected in the temperature range from about 150° F. to 300° F. as shown in column 1 of Table I. At each of these reflux temperatures, the reboiler temperature was varied to provide various ΔT's at each reflux temperature as shown in column 2 of Table I. The liquid bottoms and sample feed were passed through an equilibrium cooler which brought them to substantially the same temperature (about 67° F.). The liquid bottoms was measured and related to the sample feed to provide the percent evaporated values shown in column 3 of Table I. These values are average values for 2-4 runs at the same operating conditions. The percent evaporated values at the same temperatures as the reflux temperature were determined by the ASTM D-86 method and these values are shown in column 4 of Table I.

During these tests, it was determined that substantially no heat was lost through the insulated box 19 covering the vaporization unit 16.

column 4 of Table II together with their accuracy deviations (assuming the ASTM D-86 values are correct).

TABLE II [1]

| Reflux temp. (°F.) | T (F.°) | Deviation from ASTM for all Gasolines | Calculated T (F.°) for all gasolines with average deviation |
| --- | --- | --- | --- |
| 158 | 65 | −2.9±1.4 | 70.5±1.5 |
| 158 | 76 | +3.0±1.4 | |
| 180 | 60 | −2.2 | 75.0±1.5 |
| 180 | 70 | −1.1±0.05 | |
| 210 | 30 | −3.8±1.1 | 47.5±1.5 |
| 210 | 40 | −1.8±1.5 | |
| 250 | 35 | −2.5 | 45.5±1.5 |
| 250 | 45 | +0.1±0.7 | |
| 300 | 45 | −0.4±1.8 | 47.0±1.5 |

[1] Data based upon operating pressure of 10 p.s.i.g.

By setting the reboiler temperature at a temperature higher than the selected reflux temperature by an amount equal to the T value shown in column 4 of Table I for that selected temperature, "correct" percent evaporated values for the tested gasolines will be produced. FIGURE 4 is a graphical illustration of the T values at particular reflux temperatures which provide percent evaporated values which closely correlate with ASTM-determined percent evaporated values for the tested gasolines.

In addition to correlating the method of this invention with the ASTM D-86 method as described, correlation may be made with other methods such as the TBP method and the Equilibrium Flash Vaporization (EFV) method. In each case, the method of determining the ΔT between reflux and reboiler temperature will vary somewhat from that described in connection with the ASTM method. For example, when correlating the data of this invention with the TBP method, the ΔT is made equal to the maximum ΔT allowable without causing flooding in the tower. This maximum ΔT is calculated from known physical characteristics of the fluid and analyzer such as, for example, size of tower, packing, flooding velocities and density of liquid and vapor. In general, the ΔT so calculated will be about 100° F. to about 125° F., that is, substantially above the ASTM-related ΔT values. Rather than providing the somewhat arbitrary percent evaporated

TABLE I.—DATA

| | | Brand I, Grade A | | Brand I, Grade B | | Brand II, Grade A | | Brand II, Grade B | |
| --- | --- | --- | --- | --- | --- | --- | --- | --- | --- |
| 1 | 2 | 3 | 4 | 3 | 4 | 3 | 4 | 3 | 4 |
| Reflux temp. (° F.) | ΔT (F. °) | Percent evap. analyzer | Percent evap. ASTM | Percent evap. analyzer | Percent evap. ASTM | Percent evap. analyzer | Percent evap. ASTM | Percent evap. analyzer | Percent evap. ASTM |
| 158 | 65 | 23.9 | 27.0 | 27.85 | 30.0 | 35.2 | 40.5 | 40.5 | 41.7 |
| 158 | 76 | 22.8 | 27.0 | 25.0 | 29.6 | 38.3 | 40.45 | 42.85 | 41.7 |
| 180 | 60 | | | | | 45.4 | 47.9 | 47.95 | 50.0 |
| 180 | 70 | 35.95 | 37.0 | 36.3 | 37.2 | 47.05 | 47.9 | 48.25 | 50.0 |
| 210 | 30 | 46.8 | 51.5 | 42.9 | 47.0 | 56.3 | 58.3 | 54.6 | 59.0 |
| 210 | 40 | 50.6 | 51.5 | 42.65 | 47.0 | 58.0 | 58.3 | 57.4 | 59.0 |
| 250 | 35 | | | 57.8 | 60.8 | 68.43 | 70.5 | | |
| 250 | 45 | 66.6 | 65.8 | 60.0 | 60.9 | 71.3 | 70.5 | 68.85 | 69.0 |
| 300 | 45 | 76.9 | 74.5 | 79.65 | 81.5 | 82.2 | 84.5 | 84.9 | 84.7 |

The average deviation in the percent evaporated values from the ASTM values for all the tested gasolines was calculated at each reflux temperature and ΔT combination together with the variation of each percent evaporated value from the average deviation. These calculated data are shown in column 3 of Table II. By extrapolation or interpolation using the average deviation values for the percent evaporated and the different ΔT's at each reflux temperature, the "correct" ΔT for each reflux temperature was calculated. The latter values are set out in values obtained when this invention is correlated with the ASTM D-86 method, scientifically sound percent evaporated values corresponding to the TBP curves are produced when correlating this invention with the TBP data.

Returning now to the operation of the analyzer of this invention in which the reflux and reboiler temperatures have been selected as described, the sample is heated to produce a vapor and a liquid phase which leave the vaporization unit as earlier described. One of these two phases is measured and related to the feed rate to provide continuous recording of percent evaporated.

In a particular refinery, it will be desired to produce a particular multi-component composition for which the percent evaporated at the desired reflux temperature will be known. As long as that percent evaporated value is being measured and recorded by the analyzer, the desired composition is being produced. If, thereafter, a different percent evaporated value is measured by the analyzer, such change in percent evaporated values indicates a change in composition from the desired composition. If the measured percent evaporated value increases, this means that too much low-boiling or volatile component is being added to the make-up stock and a reduction in the amount of this component is required to provide the desired composition. Conversely, if the percent evaporated value decreases, too much high-boiling component is being added to the make-up stock thereby necessitating a decrease in the amount of this component.

As previously mentioned, the reproducibility of the hereindescribed process is exceptionally good. This is illustrated by the data of Table III which is a compilation of some of the data of Table I. The data for each brand of gasoline were obtained on different days. In each case, the second test was run three days after the first test. Because the temperature conditions were not exactly duplicated, some variation in the percent evaporated values naturally occurred. As will be seen from column 6 of Table III, the average variation in percent evaporated values determined at different times was less than about ±0.5%.

TABLE III

| 1 | 2 | 3 | 4 | 5 | 6 |
|---|---|---|---|---|---|
| Run | Gasoline | Reflux temp. (° F.) | Reboiler temp. (° F.) | Percent evap. ASTM | Percent evap. analyzer |
| 1 | Brand 1, Grade A | 179 | 250 | 47.4 | 47.4 |
| 2 | do | 180 | 250 | 47.8 | 46.2 |
| 1 | Brand 2, Grade A | 178 | 250 | 36.1 | 35.9 |
| 2 | do | 180 | 250 | 37.0 | 35.0 |
| 1 | Brand 1, Grade B | 180 | 250 | 50.0 | 48.7 |
| 2 | do | 180 | 250 | 50.0 | 47.6 |
| 1 | Brand 2, Grade B | 250 | 296 | 66.0 | 66.8 |
| 2 | do | 250 | 295 | 66.0 | 66.4 |

As will be understood from the foregoing, a method and means for continuously determining percent evaporated values which is exceptionally accurate, and reproducible and repeatable has been described. These advantages are obtained by the unique method of controlling the heat loss from the vaporization unit in combination with maintaining a constant sample fluid flow rate, a constant liquid level in the reboiler, a constant tower pressure and constant tower and reboiler temperatures. By substantially eliminating heat loss through the walls of the vaporization unit so that substantially all the heat loss is controlled by an internal, partial reflux condenser, the reflux and therefore, the percent evaporated, is made to change only in accordance with feed composition changes. Therefore, composition changes are accurately monitored by percent evaporated determinations by the herein-described method and apparatus.

Modifications of the herein-described process and apparatus may be made by those skilled in the art without departing from the spirit of the invention.

What is claimed is:

1. In an apparatus for determining the percent of a liquid evaporating at a constant temperature which includes means for maintaining (a) a substantially constant flow rate of said liquid into a vaporization unit having a heating section and a cooling section, (b) a substantially constant liquid level in said heating section and (c) a substantially constant vapor pressure in said vaporization unit and (d) means for heating said liquid in said heating section of said vaporization unit to produce a liquid phase and a vapor phase, the improvement which comprises:

means for controlling a point in said heating section at a first substantially constant temperature;

means for controlling a point in said cooling section of said vaporization unit at a second substantially constant temperature to provide a predetermined temperature differential between said heating section and said cooling section and to condense a portion of said vapor phase to produce condensate;

means for removing said liquid phase from said vaporization unit when said constant liquid level has been exceeded; and means for removing said vapor phase from said vaporization unit when said substantially constant vapor pressure has been exceeded, whereby the flow rate of one of said vapor phase and said liquid phase is related to said flow rate of said liquid to provide percent evaporated values for said liquid at said first temperature.

2. The apparatus of claim 1 which includes means for maintaining the temperature of said liquid entering said vaporization unit and the temperature of the measured fluid removed from said vaporization unit substantially equal.

3. The apparatus of claim 1 wherein said means for controlling a point in said cooling section at a substantially constant temperature comprises:

cooling means extending into said cooling section for flowing a coolant through said cooling section to condense a portion of said vapor phase;

valve means in said cooling means for varying the flow of said coolant through said cooling means; and temperature control means communicating with said valve means for measuring the temperature of said condensate and for operating said valve means in relation to said temperature of said condensate to maintain said temperature of said condensate substantially constant.

4. The apparatus of claim 3 wherein said means for controlling a point in said cooling section includes, in addition, insulation substantially completely enveloping said vaporization unit to substantially reduce heat loss through the walls of said vaporization unit.

5. The apparatus of claim 3 wherein said cooling means includes means within said cooling section for substantially uniformly distributing said coolant over the cross-sectional area of said cooling section.

6. The apparatus of claim 3 wherein the portion of said cooling means within said cooling section comprises a cooling coil for flowing coolant therethrough and means for distributing said condensate through said vapor phase for improved vapor-liquid heat transfer.

7. The apparatus of claim 3 wherein the portion of said cooling means within said cooling section comprises a continuous helical cooling coil having a plurality of spaced, alternating larger and smaller coils substantially covering the cross-sectional area of said cooling section of said vaporization unit.

8. The apparatus of claim 3 wherein said coolant is a liquid and wherein said cooling means includes pressure means for maintaining sufficient pressure on said coolant flowing through said cooling section to maintain said coolant in a liquid state.

9. The apparatus of claim 3 wherein said temperature control means comprises:

receptacle means within said cooling section for continuously receiving at least a portion of said condensate, said receptacle means positioned substantially adjacent and below said cooling means;

temperature sensing means located within said receptacle means for sensing the temperature of said condensate;

a set point temperature controller for producing a signal in proportion to the difference between a predetermined set temperature and said temperature of said condensate;

means for transmitting said temperature of said condensate from said temperature sensing means to said temperature controller; and means for transferring said signal from said set point controller to said valve means whereby said flow of said coolant is controlled to provide a substantially constant condensate temperature.

10. In an apparatus for determining the precent of a liquid evaporating at a constant temperature which includes means for maintaining (a) a substantially constant flow rate of said liquid into a vaporization unit having a heating section and a cooling section, (b) a substantially constant liquid level in said heating section and (c) a substantially constant vapor pressure in said vaporization unit and (d) means for heating said liquid in said heating section of said vaporization unit to produce a liquid phase and a vapor phase, the improvement with comprises the steps of:

means for controlling a point in said heating section at a first predetermined substantially constant temperature;

insulation means enveloping said vaporization unit and having a thickness sufficient to substantially reduce heat loss through the walls of said vaporization unit;

internal cooling means in said cooling section of said vaporization unit for cooling said vapor phase to condense a portion of said vapor phase to produce condensate, said internal cooling means having coolant flowing therethrough;

valve means connected to said internal cooling means for varying the flow of said coolant through said internal cooling means;

temperature control means responsive to the temperature of said condensate and communicating with said valve means to control the flow of said condensate through said internal cooling means to maintain a second predetermined substantially constant temperature;

means for removing said liquid phase from said vaporization unit when said constant liquid level has been exceeded; and means for removing said vapor phase from said vaporization unit when said substantially constant vapor pressure has been exceeded, whereby the flow rate of one of said vapor phase and said liquid phase is related to said flow rate of said liquid to provide percent evaporated values for said liquid at said first temperature.

11. The apparatus of claim 10, wherein said internal cooling means is a partial reflux condenser.

12. The apparatus of claim 10 wherein said coolant is water and including, in addition, pressure means for maintaining said water in a liquid state when flowing through said cooling means.

13. The apparatus of claim 10 wherein said temperature control means comprises:

receptacle means within said vaporization unit for continuously receiving and discharging a portion of said condensate;

temperature sensing means attached to said receptacle means for sensing the temperature of said condensate;

a set point temperature controller responsive to said temperature sensing means, said set point controller producing a signal proportional to the difference between said second predetermined temperature and said temperature sensed by said temperature sensing means;

means for transmitting said signal from said set point controller to said valve means for controlling the flow of said coolant through said cooling means to provide a substantially constant condensate temperature.

14. The apparatus of claim 13 wherein said receptacle means is positioned adjacent and below said cooling means.

15. The apparatus of claim 10 including, in addition, means for intimately contacting said condensate with said vapor phase to provide improved vapor-liquid heat transfer.

16. The apparatus of claim 10 wherein said internal cooling means comprises a plurality of spaced coils covering substantially the total cross-sectional area of said cooling section, whereby substantially all of said vapor phase is cooled by said cooling means.

17. In an apparatus for determining the percent of a liquid evaporating at a constant temperature which includes means for maintaining (a) a substantially constant flow rate of said liquid into a vaporization unit having reboiler and a tower, said tower having a lower section and an upper cooling section, (b) a substantially constant liquid level in said reboiler and (c) a substantially constant vapor pressure in said tower and (d) means for heating said liquid in said reboiler of said vaporization unit to produce a liquid phase and a vapor phase, the improvement which comprises:

means for controlling a point in said liquid in said reboiler at a first predetermined substantially constant temperature;

insulation means enveloping said vaporization unit and having a thickness sufficient to substantially reduce heat loss through the walls of said vaporization unit;

a partial internal reflux condenser having coolant flowing therethrough positioned in said cooling section of said tower, said reflux condenser having a plurality of coils covering substantially the total cross-section of said cooling section to cool substantially all of said vapor phase and to condense a portion of said vapor phase, said coils spaced apart for upwardly flow of said vapor phase through said reflux condenser;

packing substantially filling said tower to provide intimate mixing of said vapor phase and said condensate;

receptacle means adjacent to and below said reflux condenser for continuously receiving and discharging at least a portion of said condensate;

temperature sensing means positioned in said receptacle means for sensing the temperature of said condensate;

a set point temperature controller responsive to said temperature sensing means, said set point temperature controller producing a signal in proportion to the difference between a second predetermined temperature and the temperature of said condensate;

valve means connected to said reflux condenser for controlling the flow of said coolant through said reflux condenser;

means for transmitting said signal from said set point temperature controller to said valve means for controlling the flow of said coolant to maintain the temperature of said condensate substantially constant at said second predetermined temperature;

removing said liquid phase from said vaporization unit when said constant liquid level has been exceeded; and removing said vapor phase from said vaporization unit when said substantially constant vapor pressure has been exceeded, whereby the flow rate of one of said vapor phase and said liquid phase is related to said flow rate of said liquid to provide percent evaporated values for said liquid at said first temperature.

18. In a method for determining the percent of a liquid evaporating at a constant temperature which includes maintaining (a) a substantially constant flow rate of said liquid into a vaporization unit having a heating section and a cooling section, (b) a substantially constant liquid level in said heating section and (c) a substantially constant vapor pressure in said vaporization unit and (d) heating said liquid in said heating section of said vaporization unit to produce a liquid phase and a vapor phase, the improvement which comprises the steps of:

controlling a point in said heating section at a first substantially constant temperature;

controlling a point in said cooling section of said vaporization unit at a second substantially constant temperature to provide a predetermined temperature differential between said heating section and said cooling section said second temperature being lower than said first temperature to condense a portion of said vapor phase to produce condensate;

removing said liquid phase from said vaporization unit when said constant liquid level has been exceeded; and removing said vapor phase from said vaporization unit when said substantially constant vapor pressure has been exceeded, whereby the flow rate of one of said vapor phase and said liquid phase is related to said flow rate of said liquid to provide percent evaporated values for said liquid at said first temperature.

19. The method of claim 18 wherein said liquid is a multi-component liquid.

20. The method of claim 18 wherein the step of controlling a point in said cooling section at a second substantially constant temperature comprises:

passing a coolant into heat transfer relation with said vapor phase in said cooling section to condense a portion of said vapor phase;

continuously sensing the temperature of said condensate; and controlling the flow of said coolant through said cooling section in response to said sensed temperature of said condensate.

21. The method of claim 20 including, in addition, the step of controlling the heat loss through the walls of said vaporization unit so that substantially little heat is lost through said walls of said vaporization unit.

22. The method of claim 20 wherein said vapor phase is intimately mixed with said condensate.

23. The method of claim 20 wherein said coolant cools substantially all of said vapor phase.

24. The method of claim 20 wherein said temperature of said condensate is sensed by:

continuously collecting at least a portion of said condensate in a receptacle; and sensing the temperature of said condensate in said receptacle.

25. The method of claim 20 wherein said temperature of said condensate is measured substantially immediately after said condensate has passed out of contact with said coolant.

26. The method of claim 20 wherein said coolant is a liquid and wherein pressure is maintained on said coolant sufficient to maintain said coolant in a liquid state when passing through said cooling section.

27. In a method for determining the percent of a liquid evaporating at a constant temperature which includes maintaining (a) a substantially constant flow rate of said liquid into a vaporization unit having a heating section and a cooling section, (b) a substantially constant liquid level in said heating section and (c) a substantially constant vapor pressure in said vaporization unit and (d) heating said liquid in said heating section of said vaporization unit to produce a liquid phase and a vapor phase, the improvement which comprises the steps of:

controlling a point in said heating section at a first substantially constant temperature;

flowing a coolant through said cooling section in heat transfer relation with said vapor phase to condense a portion of said vapor phase as condensate;

controlling the heat flow through the walls of said vaporization unit so that substantially little heat is lost through said walls;

controlling the flow of said coolant through said cooling section to maintain said condensate at a second predetermined substantially constant temperature to thereby provide a predetermined temperature differential between said cooling section and said heating section;

removing said liquid phase from said vaporization unit when said constant liquid level has been exceeded; and removing said vapor phase from said vaporization unit when said substantially constant vapor pressure has been exceeded, whereby the flow rate of one of said vapor phase and said liquid phase is related to said flow rate of said liquid to provide percent evaporated values for said liquid at said first temperature.

28. The method of claim 27 wherein the control of said flow of said coolant through said cooling section comprises:

continuously collecting at least a portion of said condensate in a receptacle located in said cooling section;

sensing the temperature of said condensate in said receptacle;

comparing said sensed temperature of said condensate to said second predetermined temperature to produce a signal proportional to the difference between said sensed temperature and said second predetermined temperature;

controlling the flow of said coolant in response to said signal, whereby the temperature of said condensate is maintained substantially constant at said second predetermined temperature.

29. The method of claim 27 wherein said condensate is intimately mixed with said vapor phase.

References Cited

UNITED STATES PATENTS

| | | | |
|---|---|---|---|
| 2,306,606 | 12/1942 | Hirsch | 73—61.3 |
| 3,120,119 | 2/1964 | Luther | 73—17 |
| 3,123,541 | 3/1964 | Donnell | 73—61.3 X |
| 3,216,239 | 11/1965 | Talbot et al. | 73—17 |
| 3,221,542 | 12/1965 | Kapff | 73—61.3 |
| 3,364,731 | 1/1968 | Hook | 73—61.3 |

LOUIS R. PRINCE, *Primary Examiner.*

J. W. ROSKOS, *Assistant Examiner.*

U.S. Cl. X.R.

73—17; 202—160, 161